United States Patent [19]
Usui

[11] Patent Number: 5,676,176
[45] Date of Patent: Oct. 14, 1997

[54] BELLOWS PIPE

[75] Inventor: Masayoshi Usui, Numazu, Japan

[73] Assignee: Usui Kokusai Sangyo Kaisha Limited, Japan

[21] Appl. No.: 569,447

[22] Filed: Dec. 7, 1995

[30] Foreign Application Priority Data

Dec. 29, 1994 [JP] Japan .................. 6-339441

[51] Int. Cl.$^6$ .................. F16L 11/00; F16L 9/14
[52] U.S. Cl. .................. 138/121; 138/143; 138/140; 138/145; 138/DIG. 6
[58] Field of Search .................. 138/140, 142, 138/171, 137, 121, 143, 145, DIG. 6, 139; 428/34.1

[56] References Cited

U.S. PATENT DOCUMENTS

| | | | |
|---|---|---|---|
| 4,147,185 | 4/1979 | Hines | 138/143 X |
| 4,463,061 | 7/1984 | Otoguro et al. | 138/143 X |
| 4,505,232 | 3/1985 | Usami et al. | 138/143 X |
| 5,350,561 | 9/1994 | Takamura et al. | 138/177 X |
| 5,458,156 | 10/1995 | Okubo et al. | 138/145 |
| 5,482,090 | 1/1996 | Yamanashi | 138/142 X |

*Primary Examiner*—Patrick Brinson
*Attorney, Agent, or Firm*—Anthony J. Casella; Gerald E. Hespos; Ludomir A. Budzyn

[57] ABSTRACT

A corrugated pipe formed by electric welding of a thin-walled hoop material made of ferrite type stainless steel containing not less than 1% by weight but not more than 3% by weight of Si. A Ni-type plating may be formed to at least one surface of the pipe. The corrugated pipe is free from crystal grain growth in the vicinity of the bead area of electric welding and excellent in the mechanical strength and further has excellent corrosion resistance.

16 Claims, 1 Drawing Sheet

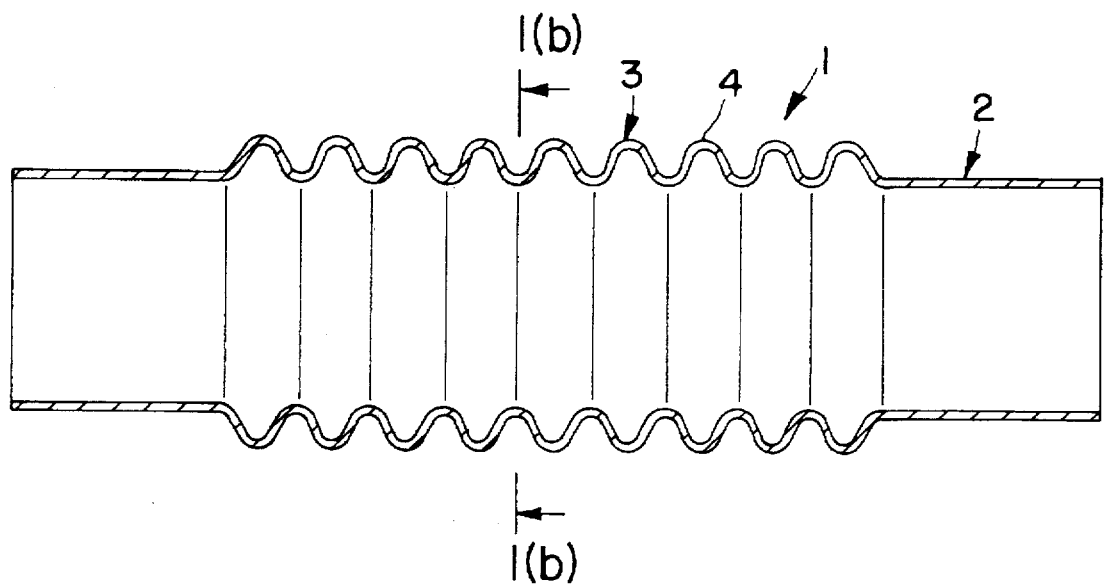
FIG. I(a)
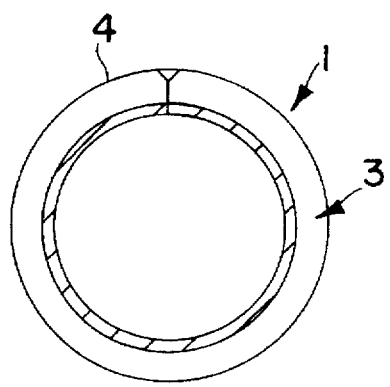
FIG. I(b)

BELLOWS PIPE

BACKGROUND OF THE INVENTION

1. Field of the Invention

The present invention concerns a corrugated pipe suitable to exhaust pipes and EGR pipes of automobiles and pipelines for various kinds of machines and equipments undergoing vibrations, which are required for flexibility and obliged to be used under vibrations, and the invention also concerns a corrugated pipe that can be used even under corrosive conditions.

2. Description of the Prior Arts

Corrugated pipes have a function of absorbing vibrations and, accordingly, they are generally used for pipe lines in engine rooms of automobiles, and pipeline connections, for example, around engines of marine vessels, and pumps and compressors for air conditioning.

Austenite type stainless steel materials such as SUS 304 are used in view of their excellent fabricability for such corrugated pipes. However, since the austenite stainless steel, are poor in heat conductivity, they involve a problem of generating thermal stresses in a thick wall portion if there is a temperature difference between inner and outer surfaces, so that stresses are exerted to cause o2 3 cracking by the thermal stress, and, in addition, stresses caused by bending deformation, vibrations and/or pressure fluctuation of internal fluid during use.

In order to avoid such a problem, it has been proposed to use ferrite type stainless steel materials as the raw material for corrugated pipes.

However, the ferrite type stainless steel materials, when welded electrically, cause crystal grain growth for a wide range in the vicinity of bead portions by welding.

The crystal grain growth area causes cracking such as axial breaking upon seizing or reducing after electric welding or upon shaping a corrugated portion by corrugating fabrication such as rolling or fluid pressure molding. In addition, since the materials are poor in the corrosion resistance and not suitable as the material for the corrugated pipes, they have not been put to practical use.

Further, since the ferrite type stainless steel materials are less resistant to corrosive internal fluid or external atmosphere, use of them under corrosive conditions is limited.

SUMMARY OF THE INVENTION

The present invention has been achieved in view of the foregoing problems of the prior art and it is an object of the present invention to provide a corrugated pipe free from crystal grain growth in the vicinity of a bead area formed by electric welding, excellent in mechanical strength and further having excellent corrosion resistance.

The foregoing object can be attained in accordance with a first aspect of the present invention by an electric welded corrugated pipe formed from a thin-walled hoop material made of ferrite type stainless steel containing not less than 1% by weight but not more than 3% by weight of Si, as well as a second aspect by an electric welded corrugated pipe formed from a thin walled hoop material made of ferrite type stainless steel containing not less than 1% by weight but not more than 3% by weight of Si, and having an Ni-type plating layer at least on one surface thereof.

The corrugated pipe according to the present invention is obtained by forming a pipe with a thin-walled hoop material made of ferrite type stainless steel containing not less than 1% by weight but not more than 3% by weight of Si, for example, by roll forming, then applying electric welding to form a cylindrical body and then applying corrugating fabrication.

The Si content is defined as not less than 1% by weight but nor more than 3% by weight, because if Si is less than 1% by weight, crystal grain growth can not be suppressed effectively to cause axial cracking along the bead area of electric welding upon seizing or reducing after electric welding or corrugating fabrication. On the other hand, if Si exceeds 3% by weight, the matrix material loses longation failing to obtain a large fabrication rate. Si is preferably from 1.5 to 2.5% by weight in order to suppress the crystal grain growth, prevent cracking in the bead area of electric welding and obtaining a higher fabrication rate.

While the above-mentioned constitution can provide a sufficient durability in usual use, it is preferred, for improving corrosion resistance upon use under corrosive conditions, to apply an Ni plating layer by electric plating or chemical plating containing a small amount of P or B to one or both surface, and the plating thickness is preferably from 2.0 µm to 15 µm.

If the thickness of the plating layer is less than 2.0 µm, the corrosion resistance can not be improved. On the other hand, even if it exceeds 15 µm, no further effect can be expected for the improvement of the corrosion resistance and the plating layer may possibly cause cracking or peeling by subsequent corrugating fabrication or bending deformation during use.

The configuration of a corrugated portion is formed into a U-shaped or Ω-shaped cross section, a spiral or ring-shaped configuration is fabricated to have a corrugated portion at a ratio of height of 1:1.1 to 1.5 relative to the diameter of the blank pipe (cylindrical body).

BRIEF DESCRIPTION OF THE DRAWINGS

FIG. 1 is a view showing a corrugated pipe according to the present invention in which FIG. 1(a) is a cross sectional view at a central portion and FIG. 1(b) is a cross sectional view taken along line A—A in FIG. 1(a).

DETAILED DESCRIPTION OF INVENTION

In the drawing, a corrugated pipe 1 comprises a cylindrical body 2 and a corrugated portion 3 and has a pipe diameter of about 8 mm to 100 mm, a wall thickness of 0.2 mm to 1.0 mm, a height for the corrugated portion of 1.2 mm to 15.0 mm and a pitch of 2.0 mm to 25 mm, which is prepared from a thin-walled hoop material made of a ferrite type stainless steel containing not less than 1% by weight but not more than 3% by weight of Si, by electric welding into a cylindrical body and then applying corrugating fabrication such as roll forming or fluid pressure forming. The corrugated pipe 1 includes an outer surface 4, which in certain embodiments, is defined by an Ni electric plating layer.

EXAMPLE 1

A hoop material made of a ferrite type stainless steel based on SUS 405, slitted into 53.4 mm width and 0.4 mm wall thickness and conditioned to a Si concentration of 2.1% by weight was formed into a pipe by roll forming and then electrically welded to form a cylindrical body of 17 mm tubular diameter. Then, corrugating fabrication was applied by roll forming to the cylindrical body to form a corrugated portion having a height of 3.0 mm and a corrugation pitch of 5.0 mm.

The thus obtained corrugated pipe was cut into 300 mm length, secured at one end by a chuck and seized at the other end between a pair of rollers, and a bending wear test was applied at a bending rate of 1200 times per minute in a horizontal direction so as to make a right angle relative to the axial line of the corrugated pipe while passing a combustion exhaust gas heated to 500° C. by a burner to the inside and blowing air at 20° C. to the outer circumferential surface. As a result, the wear limit was 64.1 MPa and no cracking was formed.

EXAMPLE 2

A hoop material made of ferrite type stainless steel based on SUS 405 as in Example 1, conditioned so as to contain 2.7% by weight of Si, slitted into the same width and having the same wall thickness as in Example 1 was electrically welded and subjected to the same corrugating fabrication as in Example 1, and then the same bending wear test was conducted as in Example 1.

As a result, the wear limit was 62.1 MPa and no cracking was formed.

EXAMPLE 3

A hoop material made of a ferrite type stainless steel based on SUS 405 as in Example 1, conditioned so as to contain 1.5% by weight of Si and slitted into the same width and having the same wall thickness as in Example 1 was electrically welded to form a cylindrical body, and an Ni electric plating layer of 10 µm thickness was formed on the outer surface thereof using an Ni plating bath comprising $NiSO_4$, $NiCl_2$ and $H_3BO_3$. Then, after applying the same corrugating fabrication as in Example 1, the same bending wear test as in Example 1 was conducted.

As a result, the wear limit was 65.1 MPa and no cracking was formed.

Then, five test specimens were prepared by cutting the obtained corrugated pipe each into 150 mm length. After heating the five specimen pipes in a heating device (oven) at 250° C. for 2 hours, they were left at a room temperature for 2 hours, then immersed in a corrosive liquid comprising 1,000 mg/l of $NH_4NO_3$, 70 mg/l of $(NH_4)_2SO_4$, 40 mg/l of $NH_4Cl$ and 450 mg/l of HCHO (80° C.±5° C.) for 2 hours, then left at a room temperature for 2 hours, further immersed in the same corrosive liquid as above for 2 hours and then left at a room temperature for 14 hours. When a corrosion resistant test comprising the above-mentioned steps as one cycle was conducted, red rust was formed after elapse of 8 cycles (average number of cycles).

COMPARATIVE EXAMPLE 1

A hoop material made of a ferrite type stainless steel of SUS 405 containing less than 1% by weight of Si and slitted into the same size and having the same wall thickness as in Example 1 was electrically welded to form a cylindrical body.

However, the thus obtained cylindrical body had crystal grain growth in the vicinity of the bead area caused axial cracking upon plastic fabrication such as seizing or reducing after electric welding, and such crack was also caused when corrugating fabrication was applied using the cylinder not applied with the plastic fabrication, failing to shape a corrugated pipe.

COMPARATIVE EXAMPLE 2

A hoop material made of usual austenite type stainless steel of SUS 304, slitted into the same width and having the same wall thickness as in Example 1 was electrically welded and subjected to the same corrugating fabrication as in Example 1 and then the same bending wear test was conducted as in Example 1.

As a result, the wear limit was 52.3 MPa.

REFERENCE EXAMPLE 1

Five specimens were prepared by cutting the corrugated pipe of the same size obtained under the same conditions as those in Example 1 each into 150 mm length. When the same corrosion resistant test as in Example 3 was conducted for the specimen pipes, red rust was formed after the elapse of 2 cycles (average number of cycles).

As has been described above according to the present invention, since the corrugated pipe is constituted by electrically welding the ferrite type stainless steel material containing not less than 1% by weight and not more than 3% by weight of Si, the temperature difference between the inner and the outer surfaces is small because of high heat conductivity and thermal stresses are caused only slightly, and there is no crystal grain growth in the vicinity of the bead area by the electric welding and no cracking is formed upon corrugating fabrication. Therefore, since the corrugated pipe is excellent in the mechanical strength and, in addition, can exhibit excellent corrosion resistance to the corrosive internal fluid or the external atmosphere by providing the Ni series plating layer to at least one surface.

What is claimed is:

1. A corrugated pipe formed by electric welding of a thin-walled hoop material made of ferrite type stainless steel containing not less than 1% by weight and not more than 3% by weight of Si.

2. A corrugated pipe as defined in claim 1, wherein the Si content is from 1.5 to 2.5% by weight.

3. A corrugated pipe as defined in claim 1, wherein an Ni-type plating layer is provided to at least one surface of the hoop material made of a ferrite type stainless steel.

4. A corrugated pipe as defined in claim 3, wherein the thickness of the Ni-plating layer is from 0.2 µm to 15 µm.

5. A corrugated pipe as defined in claim 1, having at least one cylindrical blank portion with a selected diameter and having a corrugated portion, the corrugated portion being shaped as a substantially U-shaped cross sectional configuration, and having a height at a ratio of 1:1.1 to 1.5 relative to the diameter of the cylindrical blank portion of the pipe.

6. A corrugated pipe formed by electric welding of a thin-walled hoop material made of ferrite type stainless steel containing not less than 1% by weight but not more than 3% by weight of Si, and having an Ni-plating layer to at least one surface thereof.

7. A corrugated pipe as defined in claim 6, wherein the Si content is from 1.5 to 2.5% weight.

8. A corrugated pipe as defined in claim 6, wherein the thickness of the Ni-plating layer is from 2.0 µm to 15 µm.

9. A corrugated pipe as defined in claim 6, having at least one cylindrical blank portion with a selected diameter and having a corrugated portion, the corrugated portion being shaped as a substantially U-shaped cross sectional configuration and having a height at a ratio from 1:1.1 to 1.5 relative to the diameter of the cylindrical blank portion of the pipe.

10. A corrugated pipe as defined in claim 1, wherein the thin-walled hoop material has a thickness of 0.2 mm to 1.0 mm.

11. A corrugated pipe as defined in claim 9, wherein the thin-walled hoop material has a thickness of 0.2 mm to 1.0 mm.

12. A corrugated exhaust pipe formed by electric welding of a thin-walled hoop material made of ferrite-type stainless steel containing from 1.5% to 2.5% by weight of Si, said pipe having at least one cylindrical blank portion of a selected diameter and a corrugated portion comprising a plurality of corrugations that are substantially U-shaped in cross sectional configuration, said corrugations having a height at a ratio of 1:1.1 to 1.5 relative to the diameter of the blank portion of the pipe, at least one surface of said ferrite-type stainless steel being coated with an Ni-plating layer having a thickness of from 2.0 µm to 15 µm.

13. A corrugated exhaust pipe as defined in claim 12, wherein the pipe has a diameter greater than 8 mm and less than 100 mm.

14. A corrugated exhaust pipe as defined in claim 13, wherein the pipe has a diameter of approximately 17 mm.

15. A corrugated exhaust pipe as defined in claim 12, wherein the thin-walled hoop material has a thickness of 0.2. mm to 1.0 mm.

16. A corrugated exhaust pipe as defined in claim 15, wherein the thin-walled hoop material has a thickness of approximately 0.4 mm.

* * * * *